United States Patent [19]

Chen et al.

[11] Patent Number: 5,121,158
[45] Date of Patent: Jun. 9, 1992

[54] FILTER DRIVING MECHANISM FOR COLOR OPTICAL READER

[75] Inventors: Chau-Hwang Chen; Chi-Ming C. Yu, both of Hsinchu, Taiwan

[73] Assignee: Umax Data System Inc., Hsinchu, Taiwan

[21] Appl. No.: 689,209

[22] Filed: Oct. 31, 1990

[51] Int. Cl.⁵ .............................................. G03B 27/72
[52] U.S. Cl. ................................... 355/35; 355/36; 355/38; 355/71
[58] Field of Search .................. 355/32, 35, 36, 38, 355/71

[56] References Cited

U.S. PATENT DOCUMENTS

| | | | |
|---|---|---|---|
| 3,227,044 | 1/1966 | Hunt et al. | 355/32 |
| 3,918,077 | 11/1975 | Burton et al. | 355/71 |
| 4,319,834 | 3/1982 | Terrill | 355/35 |
| 4,746,955 | 5/1988 | Slayton | 355/35 |
| 4,825,252 | 4/1989 | Suzuki et al. | 355/32 |
| 4,875,073 | 10/1989 | Ueda et al. | 355/35 |
| 4,896,185 | 1/1990 | Okuzawa | 355/32 |
| 4,939,537 | 7/1990 | Masuda et al. | 355/32 |
| 4,974,937 | 12/1990 | Haigo et al. | 355/32 |

Primary Examiner—Monroe H. Hayes
Attorney, Agent, or Firm—Armstrong, Nikaido, Marmelstein, Kubovcik & Murray

[57] ABSTRACT

A durable filter driving mechanism for a color optical reader that is capable of being positively and accurately positioned is proposed. The filter driving mechanism includes a guiding piece mounting thereon a reduction gear assembly having a reduction gear set meshing with a rack of a sliding piece having a rail coupling thereto a color filter assembly operating in cooperation with a lens assembly and a charge coupled element.

4 Claims, 5 Drawing Sheets

# FILTER DRIVING MECHANISM FOR COLOR OPTICAL READER

BACKGROUND OF THE INVENTION

The present inventin relates to a driving mechanism, and more particularly to a filter driving mechanism for a color optical reader or scanner.

The conventional filter driving mechanism for a color optical reader, as shown in FIG. 1, includes a filter frame 1, two side belt wheels 6, 7 and a transmitting belt 8 which is connected to a first connecting portion 4a of frame 1, wound around wheel 6, extended through guiding members 5c, 5b, and 5a of frame 1, wound around wheel 7 and connected to a second connecting portion 4b of frame 1 so that belt 8 can move frame 1 in the desired direction.

The filter is brought into scanning positin by belt 8 which, however, is elastic, has poor rigidity and a large inertia so that the scanning position for filter frame 1 always tends to produce a deviation. In addition, belt 8 is relatively easily fatigued owing to its frequent use and has a shortened life-span if it is excessively tightened. Furthermore, belt 8 is loosely guided by guiding members 5a-5c of filter frame 1 so that filter frame 1 cannot be moved steadily and positively guided since belt 8 has a variable elasticity.

SUMMARY OF THE INVENTION

It is therefore an objective of the present invention to provide a filter driving mechanism for a color optical reader that enables the color filter assembly thereof to be positively positioned and steadily moved.

It is a further objective of the present invention to provide a durable filter driving mechanism for a color optical reader.

The present invention provides a filter driving mechanism for a color optical reader which includes a guiding piece having a bottom sliding groove and a guiding groove, a sliding piece having a rack and a raised rail having a coupling groove and at least two flexible coupling hooks, a color filter assembly having a frame on which are evenly arranged a plurality of filtering glasses, a bottom coupling portion provided with at least two coupling holes respectively coupling therein the coupling hooks when the coupling portion is inserted into the coupling groove, and a reduction gear assembly mounted on the guiding piece and having a reduction gear set engaging with the rack.

DETAILED DESCRIPTION OF THE PREFERRED EMBODIMENT

Figure 1:
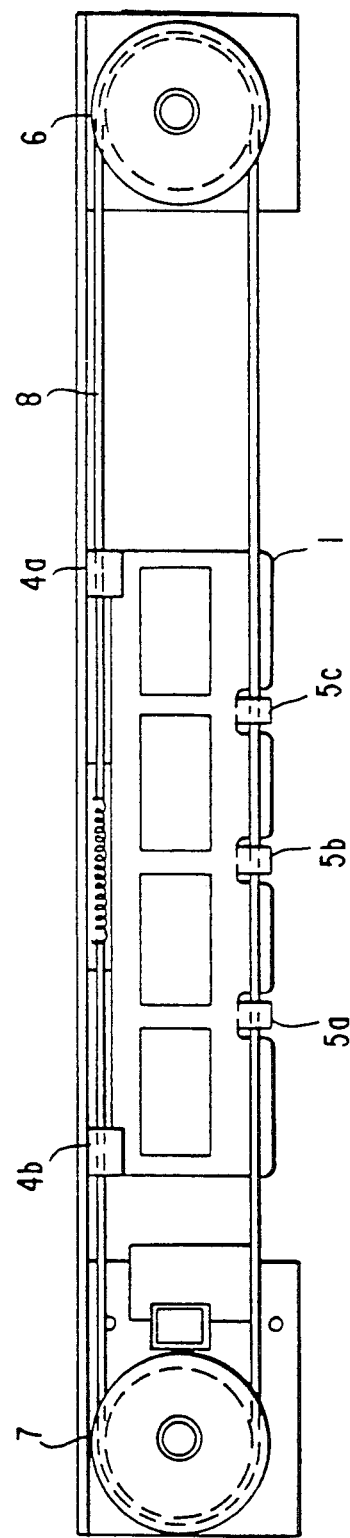
FIG. 1 is a schematic front view of a prior art filter driving mechanism for a color optical reader according to the present invention.
Figure 2:
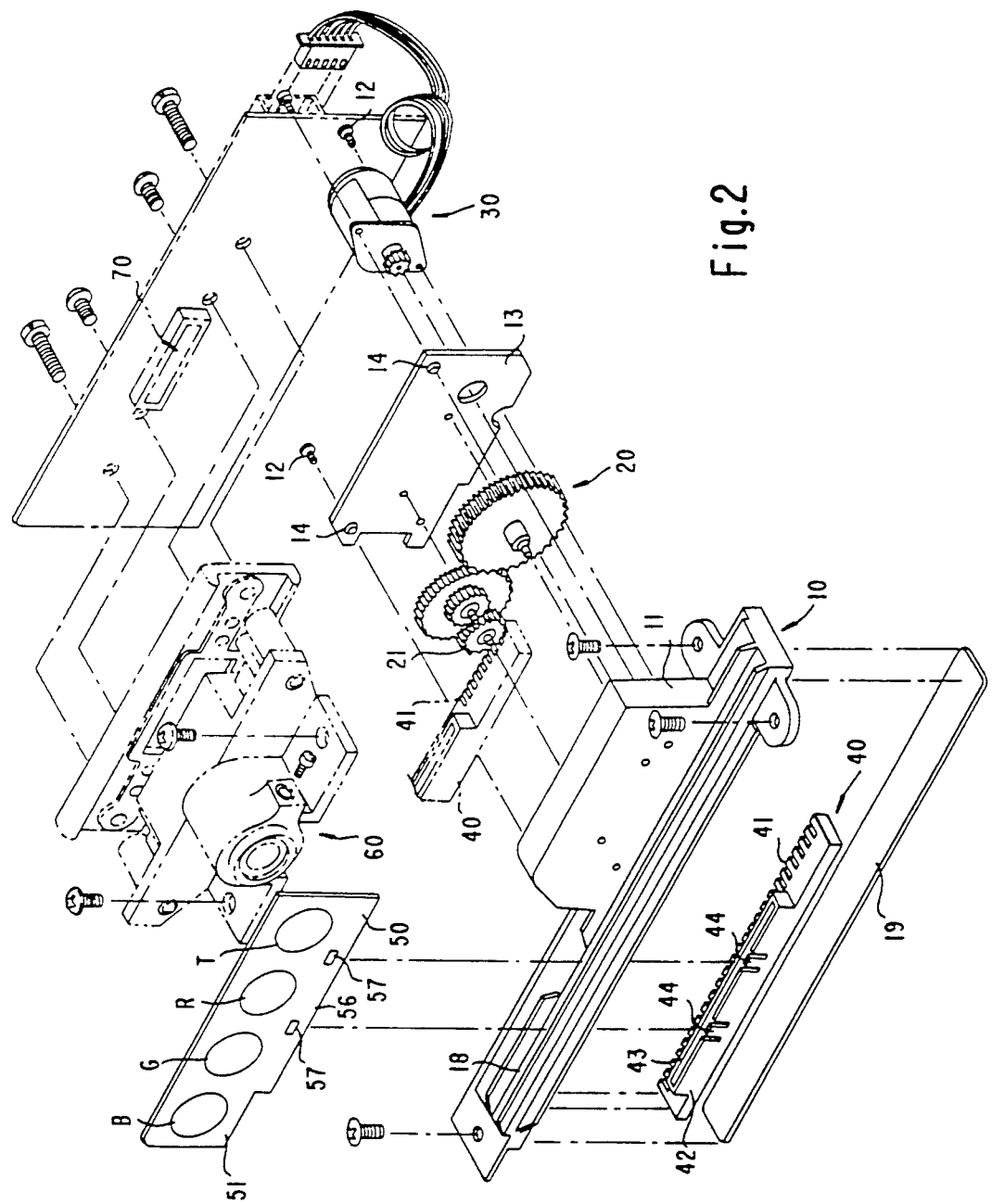
FIG. 2 is an expanded view of a filter driving mechanism for a color optical reader according to the present invention.
Figure 3:
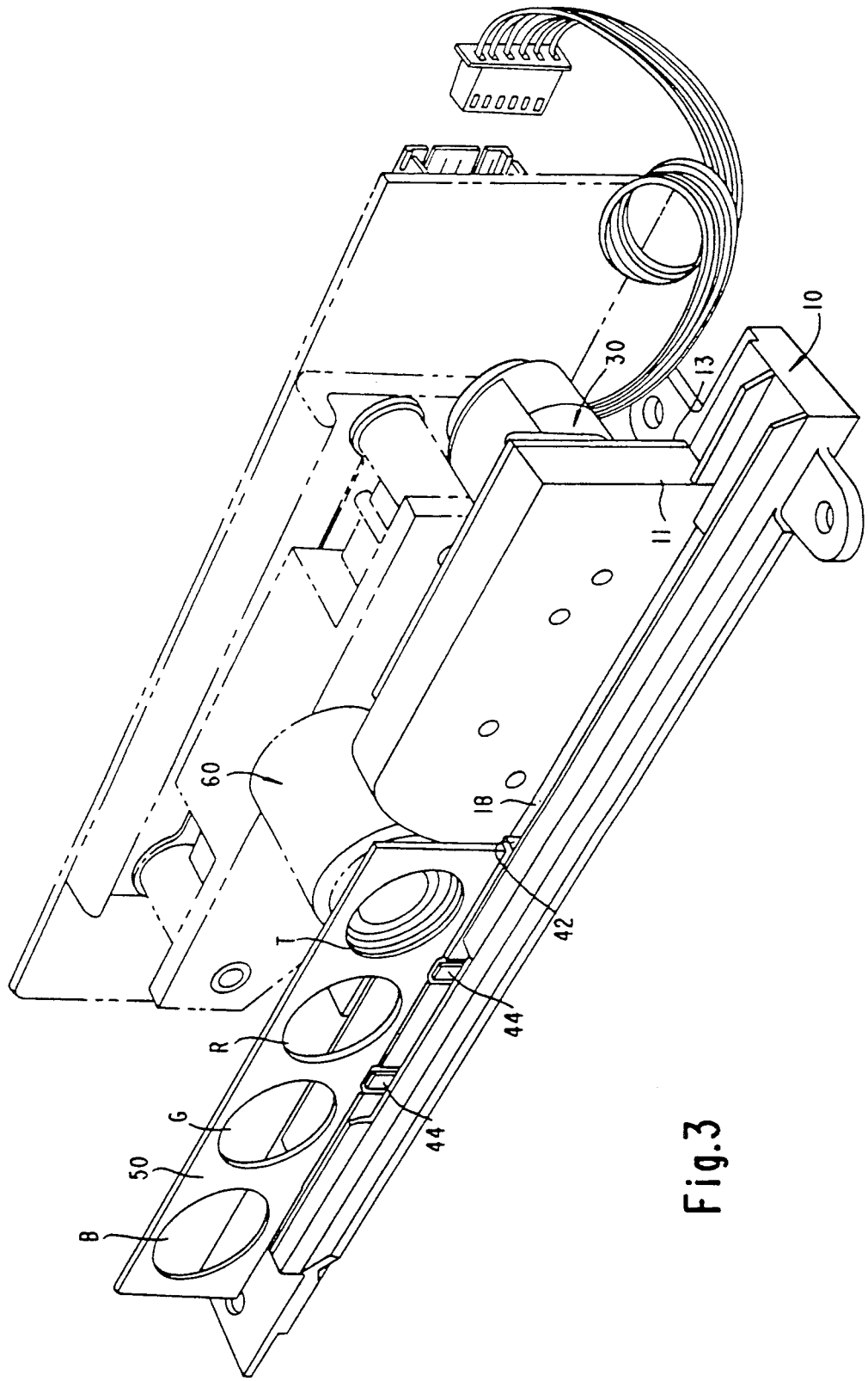
FIG. 3 is a perspective view showing the filter driving mechanism for a color optical reader shown in FIG. 2.
Figure 4:
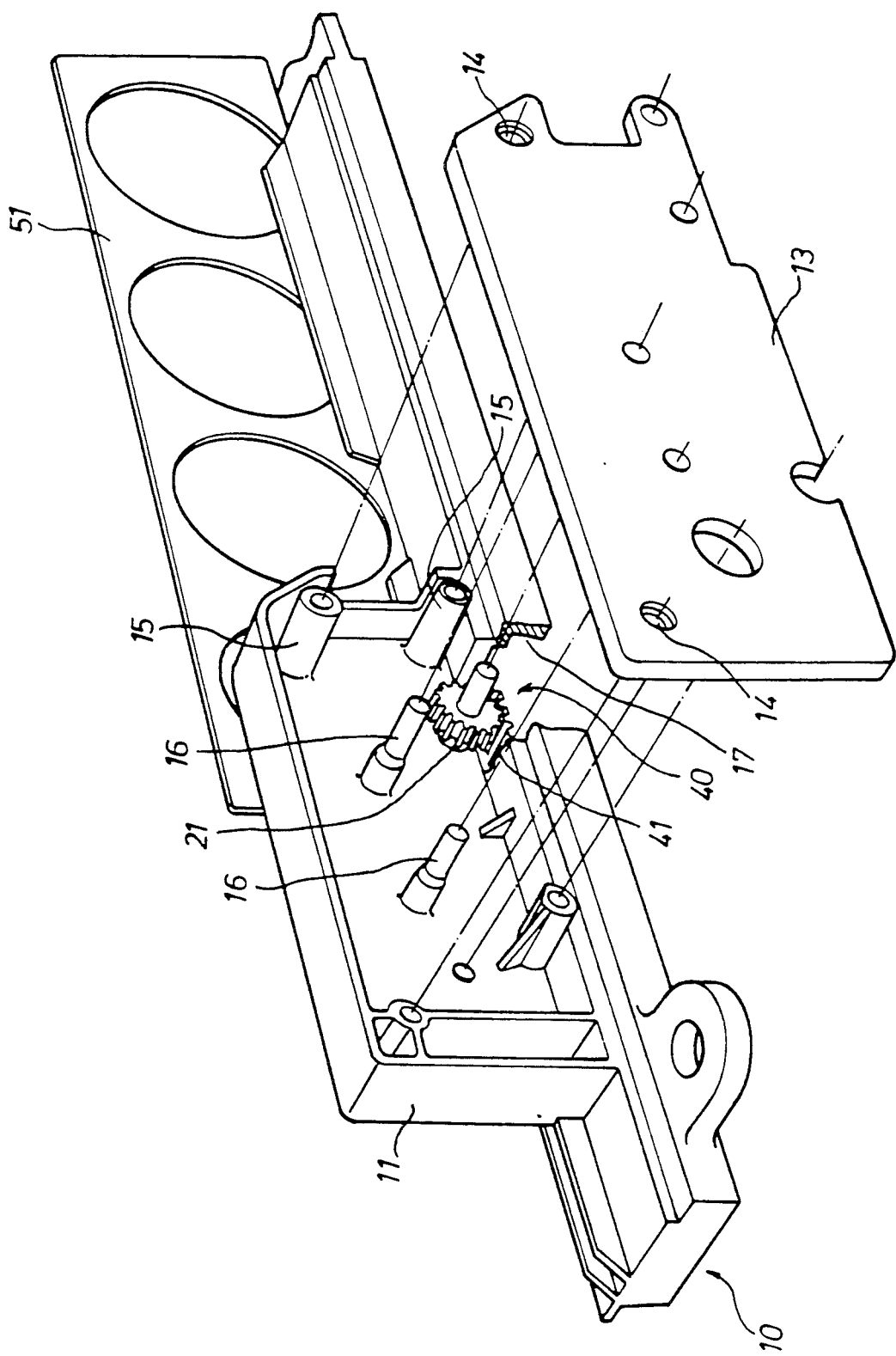
FIG. 4 is a perspective view showing some relevant elements of a filter driving mechanism for a color optical reader shown in FIG. 2.
Figure 5:
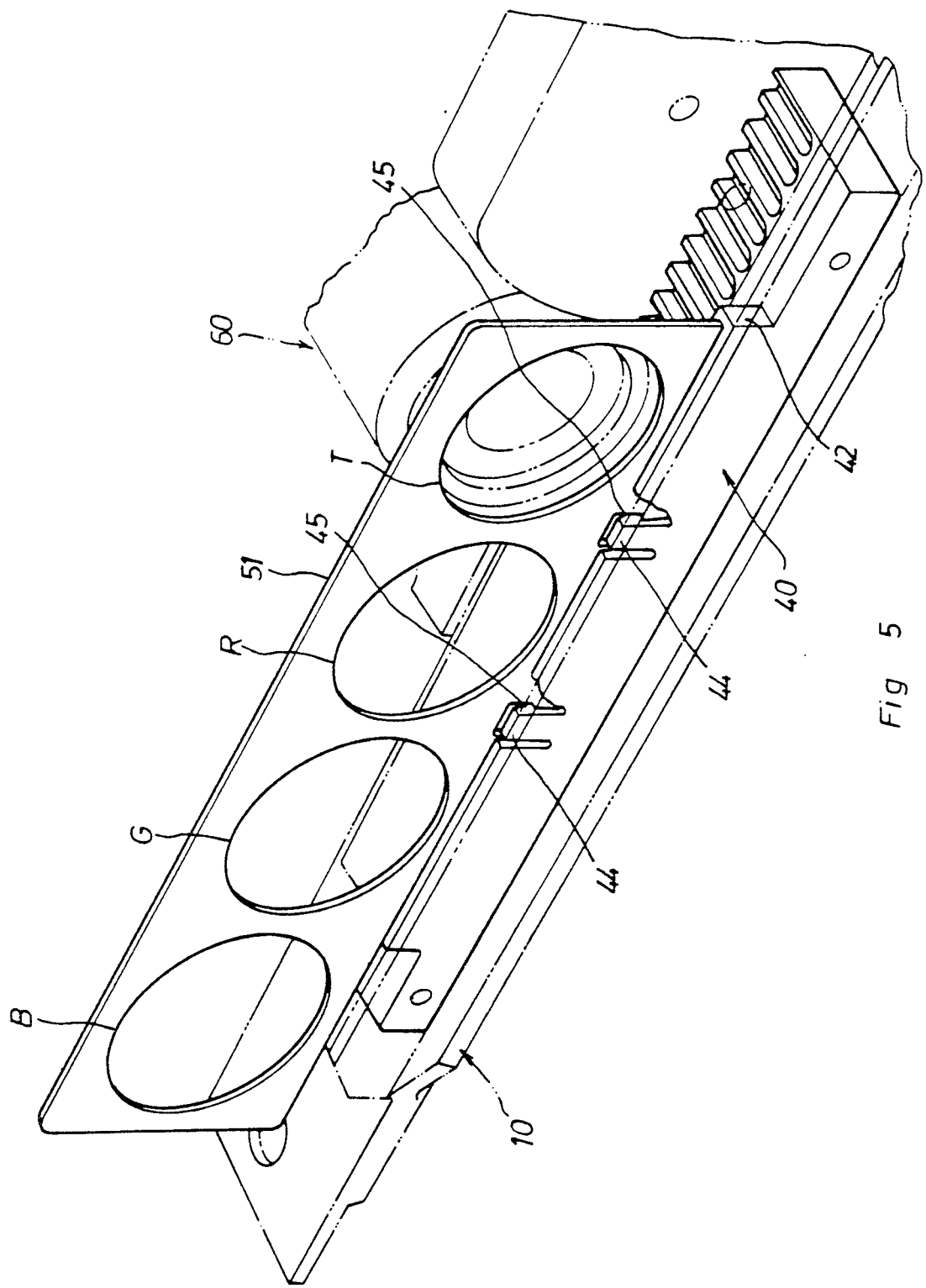
FIG. 5 is a schematic perspective view showing an engagement of a sliding piece and a color filter assembly of the filter driving mechanism for a color optical reader shown in FIG. 2.

Referring now to FIGS. 2-5, a filter driving mechanism for a color optical reader according to the present invention includes a guiding piece 10 of a reduction gear assembly having a housing 11 and a reduction gear set 20, a stepping motor 30, a sliding piece 40, and a color filter assembly 50. Guiding piece 10 has a bottom sliding groove 17, a guiding groove 18 communicating with sliding groove 17 and a bottom cover 19 to cover sliding piece 40 in sliding groove 17.

Housing 11, closed by cover 13 having stepping motor 30 affixed thereto and being fixed to housing 11 by a plurality of screws 12 transversing through screw holes 14, includes a plurality of positioning shafts 16 for respectively mounting thereon the gears of reduction gear set 20, and a plurality of positioning cylinders 15 into which screws 12, transversing through screw holes 14, respectively lodge.

Sliding piece 40 slidably received in sliding groove 17 includes a rack 41 and a raised rail 42 which projects above guiding groove 18 and has a coupling groove 43 the defining wall of which includes at least two flexible coupling hooks 44 each of which includes a downwardly inwardly extending hooking portion 45. The sliding friction of sliding piece 40 can be reduced if piece 40 is provided with fine rollers.

Color filter assembly 50 includes a generally rectangular frame 51 evenly arranging therein a translucent filtering glass T, a red filtering glass R, a green filtering glass G and a blue filtering glass B. The color filter assembly 50 also has a coupling portion 56 provided with at least two coupling holes 57 capable of respectively retaining therein hooking portions 45 of hooks 44 when coupling portion 56 has been aligned and inserted into coupling groove 43 to forcedly pass hooking portions 45 after sliding piece 40 is received in sliding groove 17 and rack 41 is caused to mesh with the driving gear 21 of reduction gear set 20 which means that raised rail 42 projects above guiding groove 18. Color filter assembly 50 must work with a lens assembly 60 and a charge coupled element 70, both of which are known and deserve no further description here, in order that any one of glasses T, R, G, and B can be correctly positioned in front of the lens.

The operation of the present invention is now described as follows:

After being energized, the present invention will automatically determine the magnitude of the image signal. If glass T is not positioned in front of lens assembly 60, color filter assembly 50 will be moved by the cooperation of reduction gear assembly 20 and sliding piece 40 to the position shown in FIG. 3. If the movement of color filter assembly 50 is out of synchronization or encounters an obstacle, the designed system control will command stepping motor 30 to first leftwardly and then rightwardly move assembly 50 in order to obviate the obstacle. If the obstacle cannot be obviated or the set steps are exceeded, an error signal will be generated to protect the present invention and to notify the user.

In dealing with the plain image, the gray scale, the monochrome scale or the semi-color scale of the present invention, T glass is capable of performing the scanning task at one time during which the present permanently magnetic stepping motor 30 is "locked" to maintain the "holding torque" to prevent color filter assembly 50 from shaking.

In color-scanning, stepping motor 30 will rightwardly move filter assembly 50 an appropriate distance to position R glass in front of lens assembly 60 within about 0.38 sec to determine by the image signal whether filter assembly 50 is correctly positioned. If not, filter assembly 50 is first leftwardly moved to the position shown in FIG. 3 and again rightwardly moved 18 mm to automatically correct and obviate the obstacle. If the obstacle still is not obviated, an error signal will be generated to notify the user.

The color-scanning operation of the mechanism of the present invention is executed according to systematic instructions and obtains continuity by the coordination of the software, and the hardware. Filtering glasses R, G, and B can be selected to match with the exposing or main-scanning time (i.e., the X-axis) of the charge coupled element 70 and to complete the operation of the sub-scanning (i.e., the Y-axis).

Through the above description, it should now become readily apparent how and why the present invention can achieve the objectives it contemplates. It should also be clear that the scanning speed and effectiveness of the present invention are also increased and improved. It should also be understood that modifications to the above described embodiment can be made by those skilled in the art without departing from the spirit and scope of the present invention.

What I claim is:

1. A filter driving mechanism for a color optical reader comprising:
   a guiding piece having a bottom sliding groove and a guiding groove communicating with said bottom sliding groove;
   a sliding piece received in said bottom sliding groove, and including a rack and a raised rail which projects above said guiding groove and includes a coupling groove and at least two flexible coupling hooks;
   a color filter assembly having a frame in which there are evenly arranged thereon a plurality of filtering glasses and including a bottom coupling portion provided with at least two coupling holes capable of respectively coupling therein said coupling hooks when said coupling portion is inserted into said coupling groove; and
   a reduction gear assembly mounted on said guiding piece and having a reduction gear set which is adapted to be driven by a stepping motor and meshes with said rack.

2. A filter driving mechanism according to claim 1 wherein each of said coupling hooks is provided on a wall defining said coupling groove and includes a downwardly inwardly extending hooking portion to be retained in one respective said coupling hole.

3. A filter driving mechanism according to claim 1, further comprising a bottom cover for slidably covering said sliding piece in said sliding groove.

4. A filter driving mechanism according to claim 1 wherein said filtering glasses include color ones and a translucent one.

* * * * *